United States Patent [19]

Tsurufuji

[11] Patent Number: 5,564,214
[45] Date of Patent: Oct. 15, 1996

[54] INTER-LINE FISHING ROD

[75] Inventor: Tomoyoshi Tsurufuji, Saitama, Japan

[73] Assignee: Daiwa Seiko, Inc., Tokyo, Japan

[21] Appl. No.: 318,969

[22] Filed: Oct. 6, 1994

[30] Foreign Application Priority Data

Oct. 8, 1993 [JP] Japan .................................. 5-277767

[51] Int. Cl.⁶ .................................................. A01K 87/04
[52] U.S. Cl. .................................................................. 43/24
[58] Field of Search ........................... 43/24, 18.5, 18.1

[56] References Cited

U.S. PATENT DOCUMENTS

| | | | |
|---|---|---|---|
| 3,432,958 | 3/1969 | Bellinger | 43/24 |
| 4,024,666 | 5/1977 | Carver | 43/18.1 |
| 4,212,126 | 7/1980 | Barnett | 43/24 |
| 4,616,438 | 10/1986 | Ohmura | 43/24 |

FOREIGN PATENT DOCUMENTS

| | | | |
|---|---|---|---|
| 249360 | 8/1963 | Australia | 43/24 |
| 1332647 | 6/1963 | France . | |
| 1385014 | 11/1964 | France . | |
| 2560005 | 8/1985 | France . | |
| 2641269 | 3/1978 | Germany | 43/24 |
| 56-127032 | 10/1981 | Japan . | |
| 1526581 | 9/1978 | United Kingdom . | |

OTHER PUBLICATIONS

Soviet Patent Abstracts; PQ section, week 9304; 17 Mar. 1993.

*Primary Examiner*—J. Elpel
*Attorney, Agent, or Firm*—Longacre & White

[57] ABSTRACT

An inter-line fishing rod which can hold annular fishline guide members positively on the inner surface of a rod tube. The inter-line fishing rod includes annular fishline guide members (30) respectively mounted on the inner surface of a rod tube (12) formed of fiber reinforced synthetic resin. The fishing rod is arranged such that minute projections (36) are provided on the outer periphery of the fishline guide members (30) facing the inner surface (12S) of the rod tube (12), and the minute projections (36) are pressed against the rod tube inner surface (12S).

19 Claims, 5 Drawing Sheets

FIG. 12

INTER-LINE FISHING ROD

BACKGROUND OF THE INVENTION

The present invention relates to an inter-line fishing rod in which a fishline is at least partially passed through the inside of a rod tube.

In Japanese Patent Kokai Publication No. Sho. 56-127032, there is disclosed an inter-line type fishing rod having a large number of annular members which are fixed to the inside of a rod tube to define a fishline guide passage. According to the disclosure of the present publication, since the rod tube includes a tapered inner surface, the annular members can be settled at their respective given positions by the action of the casting operation and also they may be adhesively fixed at those positions as the need arises.

However, even when the annular members are held at their respective given positions by the action of the casting operation while they are not adhesively fixed, the annular members can drop down due to some shocks, tension of the fishline, loads caused by the movement of the fishline, and influences given by the bending of the rod tube when the rear portion of the rod tube is located down. Even if the annular members are adhesively fixed, the fixture cannot be stabilized. This is because, when a rod tube is produced, a surface lubricant is applied onto the surface of a core metal and part of the surface lubricant can often be left on the inner surface of the produced rod tube, which hinders the stable adhesive fixture of the annular members.

SUMMARY OF THE INVENTION

In view of the above, it is an object of the invention to provide an inter-line fishing rod in which a plurality of fishline guide members can be held on the inner surface of a rod tube.

In attaining the above object, the present invention provides an inter-line fishing rod which can hold annular fishline guide members positively on the inner surface of a rod tube.

More specifically, the present invention provides, as a first aspect thereof, an inter-line fishing rod which includes: a rod tube designed to permit a fishline to at least partially pass through an inside thereof, the rod tube having an inner surface; and an annular fishline guide member having at least one minute projection formed on an outer periphery thereof facing the inner surface of the rod, wherein the minute projection is pressed against the inner surface of the rod tube when the annular fishline guide member is located at a predetermined position with respect to the rod tube so as to retain the annular fishline guide member in the predetermined position.

The present invention further provides, as a second aspect thereof, an inter-line fishing rod which includes: a rod tube designed to permit a fishline to at least partially pass through an inside thereof, the rod tube having an inner surface; and an annular fishline guide member mounted on the inner surface of the rod tube, wherein: the rod tube is formed with a small diameter portion on a portion of the inner surface to retain the annular fishline guide member in a predetermined position.

The present invention further provides, as a third aspect thereof, an inter-line fishing rod which includes: a rod tube designed to permit a fishline to at least partially pass through an inside thereof, the rod tube having an inner surface; and an annular fishline guide member adapted to be mounted on the inner surface of the rod tube, wherein a minute uneven surface portion is formed integrally on the inner surface of the rod tube, and the fishline guide member is adhesively fixed to the minute uneven surface portion.

The present invention further provides, as a fourth aspect thereof, an inter-line fishing rod which includes: a rod tube designed to permit a fishline to at least partially pass through an inside thereof, the rod tube having an inner surface; an annular fishline guide member mounted on the inner surface of the rod tube, the fishline guide member having a recessed portion formed in an outer periphery of the fishline guide member, the recessed portion defining an inclined surface; and a movement restriction member installed in the recessed portion for performing, in cooperation with the inclined surface and the inner surface, a selective wedge action which permits a movement of the annular fishline guide member along the inner surface in a first direction and inhibits a movement of the annular fishline guide member along the inner surface in a second direction opposite to the first direction.

In an embodiment according to a first aspect of the invention, a plurality of annular fishline guide members are mounted on the inner surface of a rod tube formed of fiber reinforced synthetic resin. Each of the annular fishline guide members includes a plurality of minute projections on the outer periphery thereof facing the inner surface of the rod tube, and the minute projections are pressed against the rod tube inner surface. Since the minute projections of the fishline guide members get caught on the inner surface of the rod tube, the fishline guide members are prevented from slipping off the rod tube inner surface, so that the fishline guide members can be held positively.

Also, in an embodiment according to a second aspect of the invention, a plurality of annular fishline guide members are mounted on the inner surface of a rod tube formed of fiber reinforced synthetic resin. The portions of the rod tube where the fishline guide members are mounted or the portion of the rod tube existing behind the mounting portions are formed as small diameter portions. Although the fishline guide members can move backwardly in the rod tube, since the fishline guide member mounting positions of the rod tube or the portions thereof behind the mounting portions are so formed as to be small in diameter, the fishline guide members are secured to or stopped by the small diameter portions of the rod tube and thus can be held positively.

Further, in an embodiment according to a third aspect of the invention, a plurality of annular fishline guide members are mounted on the inner surface of a rod tube formed of fiber reinforced synthetic resin. A minute uneven surface portion is formed integrally on the rod tube inner surface and the fishline guide members are adhesively fixed to the minute uneven surface portion. Since the minute even surface portion is formed integrally on the inner surface of the rod tube, the rod tube inner surface is in a highly strong rough surface condition and thus, if an adhesive agent is applied between the rough surface and the fishline guide members, then the adhesive force is increased to a great extent, which makes it possible to hold the fishline guide members positively.

Moreover, in an embodiment according to a fourth aspect of the invention, a plurality of annular fishline guide members are mounted on the inner surface of a rod tube formed of fiber reinforced synthetic resin. A recessed portion is formed in the outer periphery of the fishline guide member, the recessed portion includes such an inclined surface as increases the depth of the recessed portion from the front portion thereof to the back end portion thereof in a state that the fishline guide member is inserted in the rod tube, and there is stored in the recessed portion an annular member having an outside diameter substantially equal to the inside diameter of the portion of the rod tube where the fishline guide member is inserted or a spherical or arc-shaped member having such a size that allows itself to be stored just in the recessed portion. The existence of the inclined surface forming the recessed portion of the fishline guide member allows the annular member or the like to be positioned deep in the recessed portion when the fishline guide member is inserted into the rod tube, which makes it possible to insert the fishline guide member smoothly. On the other hand, when the fishline guide member is going to slip out of a given position in the rod tube, the inclined surface is going to run on the inner peripheral side of the annular member or the like to spread out (push out) the annular member or the like outwardly. As a result of this, the fishline guide member gets caught on the rod tube inner surface and is thus prevented from slipping away from the inner surface of the rod tube.

DETAILED DESCRIPTION OF THE PREFERRED EMBODIMENTS

Description will be given hereinbelow in more detail of the invention by use of the embodiments thereof respectively shown in the accompanying drawings.

Figure 1:
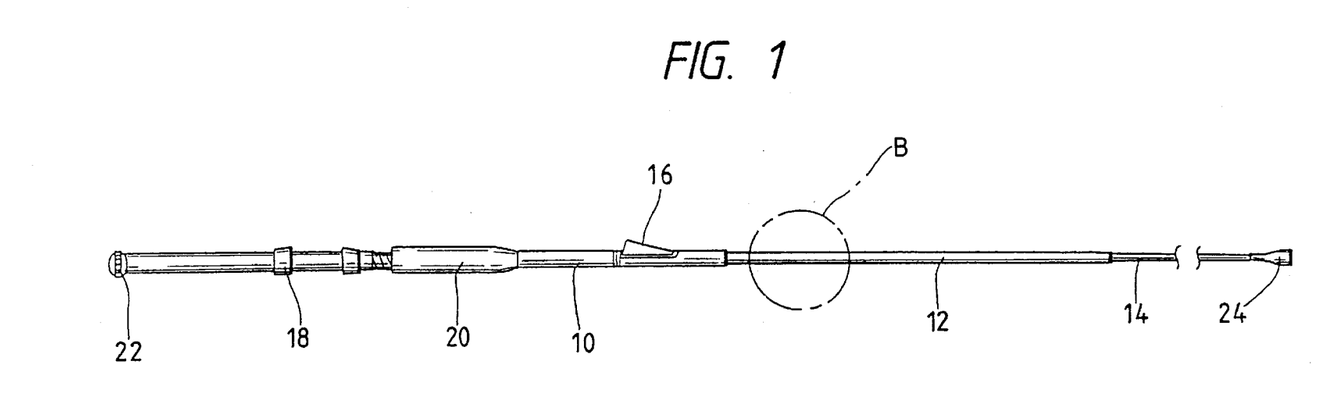
FIG. 1 is a side view of an inter-line fishing rod according to the invention.

FIG. 1 is a side view of an inter-line fishing rod in which a fishline is at least partially passed inside of a rod tube, according to the invention. In the inter-line fishing rod, a middle rod tube 12 is connected to a base rod tube 10, a tip rod tube 14 is connected to the top end of the middle rod tube 12, and a tip ring 24 is mounted on the top end of the tip rod tube 14. In the front portion of the base rod tube 10, there is provided a fishline introduction guide 16 which is used to introduce a fishline (not shown) into the rod tube, the fishline being drawn from a reel (not shown) fixed by a reel seat 18. In FIG. 1, reference character 20 designates a grip portion.

Figure 2:
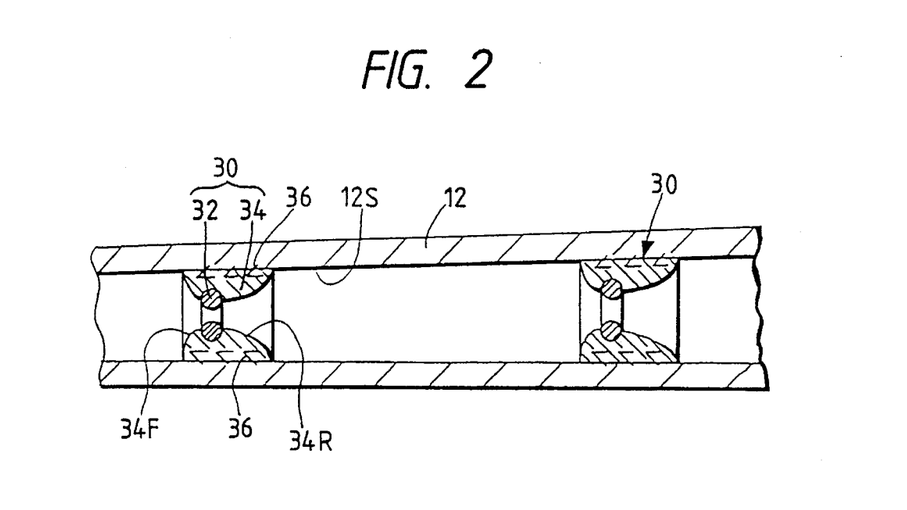
FIG. 2 is an enlarged longitudinal section view of a portion B shown in FIG. 1.

In FIG. 2, there is shown an enlarged section view of a portion B in FIG. 1, which is a structure according to a first aspect of the invention. The inner surface 12S of the rod tube formed of fiber reinforced synthetic resin, not only in the middle rod tube 12 but also other rod tubes, is generally formed in a tapered manner. Due to this, annular fishline guide members 30 are respectively different little by little in the outer dimensions thereof from one another according to positions where they are held and, in manufacturing the fishline guide members, the more ahead the fishline guide members are positioned, the more smaller the outside diameters of the fishline guide members are.

The fishline guide member 30 includes a guide ring 32 formed of ceramics, metal, or a composite material reinforced with metal or ceramics to provide a sufficient wear resistance, and an annular support element 34 which is used to support the guide ring 32 and is formed of synthetic resin, rubber, light metal, a fiber reinforced composite material or the like. And a slippage preventive claw 36 formed of a metal material having an anti-corrosion property such as stainless steel or the like is in part embedded into the outer periphery of the support element 34 while the remaining portions of the claw 36 are projected therefrom.

Since the direction of projection of the claw 36 is rightward (backward) in FIG. 2, when the respective fishline guide members 30 are inserted into the middle rod tube 12, the slippage preventive claw 36 interferes little with such insertion and, after the fishline guide members 30 are pushed into their respective given positions, they get caught on the inner surface 12S of the middle rod tube 12 due to existence of the sharp slippage preventive claws 36 and are thus prevented from slipping away in the backward direction.

Also, instead of the slippage preventive claw 36, similarly to the case of a guide ring 32' shown in FIG. 3 which will be described later, a plurality of minute projections may be formed integrally on the outer periphery of a support element 34 made of a hard material and may be pressed against the rod tube inner surface 12S to bite into the same.

Further, alternatively, a minute projection-like portion may be formed in the rear end portion or the like of the support element 34 and may be elastically pressed against the rod tube inner surface for prevention of slippage of the fishline guide member. The amount of projection and shape of the minute projections may be determined in such a manner that the projections can be pressed against the rod tube inner surface to such an extent as not to lower the strength of the main body of the rod tube. Also, the position and number of the projections can be selected arbitrarily.

The support element 34 includes a rear inner surface 34R which is inclined such that the bore diameter thereof can be gradually decreased forwardly of the middle rod 12. Also, the support element 34 includes a front inner surface 34F which is rounded into a shape with no corner. Therefore, in a casting operation, the fishline can be played out smoothly along the inclination of the rear inner surface 34R and, in a take-up operation, even if the fishline gets into contact with the front inner surface 34F or the like, the fishline can be protected against damage.

Further, the guide ring 32, as shown in FIG. 2, may be a ring having a circular or elliptic cross section, or a ring having a thin plate shape. Moreover, in order to improve the fishline sliding property and wear resistance of the surface of the guide ring 32, a hard film may be formed on the surface of the guide ring 32 by ion plating or the like.

As the material for the support element 34, it is preferable to use a light material having a smaller specific gravity than the rod tube and guide ring 32. Also, it is preferable to use a soft material which can absorb the deformation of the middle rod 12 and shocks given from outside.

The materials and shapes of the support element 34 and guide ring 32 described above apply similarly to the following embodiments of the invention.

The mounting positions of the fishline guide members 30 can be distributed uniformly over the respective rod tubes 10, 12 and 14. However, it is preferable that a larger number of fishline guide members 30 are provided in the portions that can be flexed and deformed to a greater extent, because the contact of the fishline with the rod tube inner surface can be prevented. In this sense, the area B shown in FIG. 1, which is located in the rear portion of the middle rod tube 12, is a portion that can be flexed greatly, so that it is effective to provide a large number of fishline guide members 30 in this area B.

The inside diameters of the guide ring 32 are set larger as the inside diameters of the portions of the rod tube on which the same guide ring 32 (or the fishline guide member 30) is mounted increase. However, the increasing ratio of the inside diameters of the guide ring 32 may be set smaller than the increasing ratio of the inside diameters of the rod tube, in order to obtain a greater dimensional difference between their inside diameters and the rod tube diameters.

Figure 3:
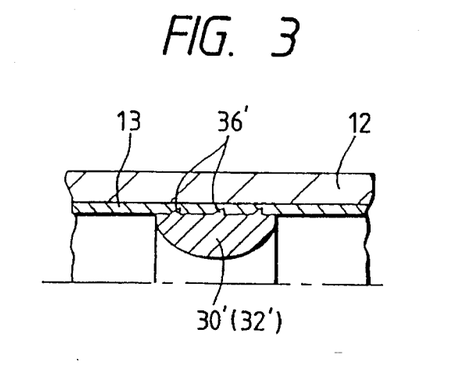
FIG. 3 shows an example of a structure replaceable from the structure shown in FIG. 2.

Now, FIG. 3 shows an example of an alternative structure for an inter-line fishing rod according to the first aspect of the invention. In this embodiment, a soft film 13 made of synthetic resin or the like is formed on the inner surface of a middle rod tube 12 and an annular fishline guide member 30' including slippage preventive projections 36' on the outer periphery thereof is inserted in pressure contact with the film 13. The soft film or layer 13, which is soft in comparison with the rod tube 12, is preferably formed such that a thin film sheet is attached and fixed on the inner periphery of the rod tube 12. Alternatively, a resin paint may be coated or applied on the inner periphery of the rod tube 12. Further, a hot melt adhesive which is normally hardened but provides a tacky property when being heated may be applied on the inner periphery of the rod tube 12 to form the soft film layer 13. The fishline guide member 30' is here exactly a guide ring 32' and no support element exists. The slippage preventive projections 36' are oriented in the rear direction similarly to the above-mentioned slippage preventive claw 36 and thus the slippage preventive projections 36' bite into the film 13 to thereby prevent the fishline guide member 30' from slipping off in the rear direction from the inside of the rod tube 12. Alternatively, the film 13 may be omitted and the slippage preventive projections 36' of the fishline guide member 30' may be directly pressed against and get caught on the inner surface of the middle rod tube 12.

Figure 4:
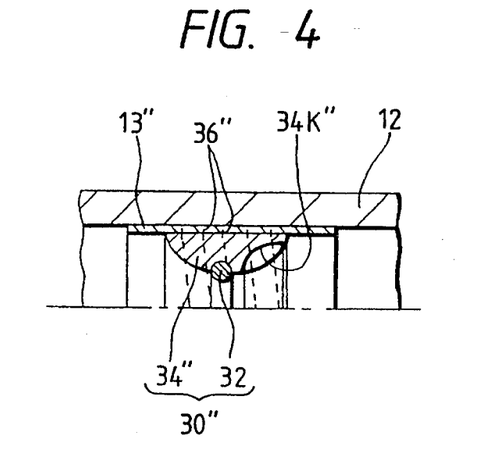
FIG. 4 shows an example of another structure replaceable from the structure shown in FIG. 2.

In FIG. 4, there is shown another example of the alternative structure for an inter-line fishing rod according to the first aspect of the invention. In the structure, a soft film 13" made of synthetic resin or the like is formed at a given position on the inner surface of the middle rod tube 12, and a fishline guide member 30" including helical claws 36" embedded in the outer periphery thereof (shown with dashed lines in FIG. 4) is forced into the soft film 13". The fishline guide member 30" includes a guide ring 32 and a support element 34", and a securing recessed portion 34K is formed in the rear inner peripheral portion of the support element 30". That is, by engaging a jig with the securing recessed portion 34K, the fishline guide member 30" can be easily forced into the middle rod tube 12 from the rear portion thereof.

The above-mentioned embodiments (examples) are designed mainly in accordance with the first aspect of the invention, whereas description will be given below of four embodiments which are respectively designed in accordance with the second aspect of the invention.

Figures 5A, 5B:
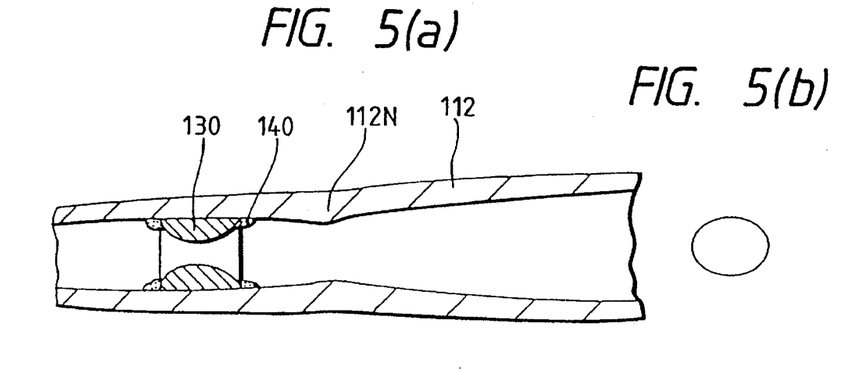
FIG. 5 is an enlarged longitudinal section view of an embodiment according to the second aspect of the invention, corresponding to FIG. 2.

At first, FIG. 5 shows an example of a structure for an inter-line fishing rod according to the second aspect of the invention, in which a fishline guide member (guide ring) 130 is fixed to the front portion of a small diameter portion 112N in a rod tube 112 by use of an adhesive agent 140. The small diameter portion 112N includes an elliptic inner periphery, as drawn in the right portion of FIG. 5, which has a small vertical diameter and a large horizontal diameter, and has substantially the same peripheral length as the outer peripheral length of the fishline guide member 130. Therefore, when the fishline guide member 130 is inserted, the inner periphery of the small diameter portion 112N is deformed along the annular outer shape of the fishline guide member 130, which makes it possible to insert the fishline guide member 130 into the front portion of the small diameter portion 112N. Also, although the inner periphery of the small diameter portion 112N has an elliptic shape in this embodiment, alternatively, an ordinary non-circular shape can also be employed.

After then, the fishline guide member 130 is fixedly secured to the inner surface of the rod tube 112 by use of the adhesive agent 140. Even if the adhesive agent is peeled for the above-mentioned reason, since the front portion of the rod tube 112 with respect to the fishline guide member 130 is formed thin and the rear portion thereof is formed as the small diameter portion 112N, the fishline guide member 130 can move little back and forth and can be held at its initial position in the rod tube 112. The small diameter portion 112N can be formed simultaneously when the main body portion of the rod tube 112 is formed. Alternatively, after the fishline guide member 130 is fixed at a given position, the portion of the rod tube corresponding to the fixed fishline guide member 130 may be deformed or drawn by heating and pressurizing to thereby produce the small diameter portion 112N. Also, since the small diameter portion 112N is deformed when the fishline guide member 130 is inserted, the rod tube 112 is formed in such a manner that the portion thereof in the neighborhood of the small diameter portion 112N is rather large in thickness, in order to prevent the permanent deformation of the rod tube 112.

Figure 6:
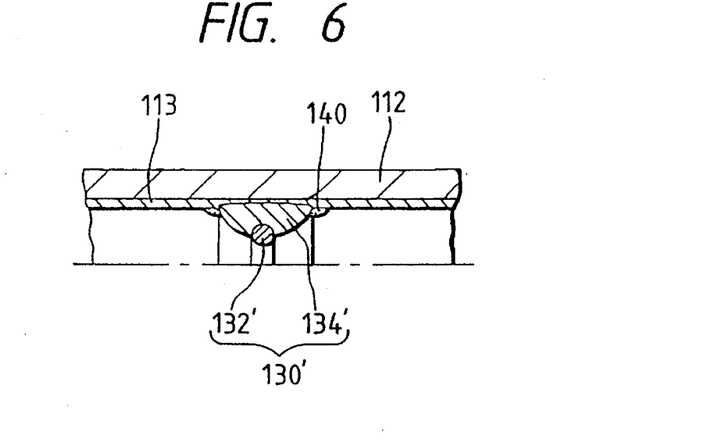
FIG. 6 shows an example of a structure replaceable from the structure shown in FIG. 5.

FIG. 6 shows another example according to the second aspect of the invention, wherein a soft film 113 made of nylon, vinyl chloride, heat resisting rubber or the like is formed integrally on the whole or part of the inner periphery of a rod tube 112, and an annular fishline guide member 130' including a guide ring 132' and a support element 134' is forced into the soft film 113. The soft film layer 113 may be formed by the same manner as that of the embodiment shown in FIGS. 3 and 4. An adhesive agent 140 may further be used to fix the fishline guide member 130' in cooperation with the soft film 113. The forced insertion of the fishline guide member 130' causes a recessed portion in the soft film 113, with the result that a small diameter portion is formed behind the recessed portion, which is located at the rear portion of the fishline guide member 130'.

Figure 7:
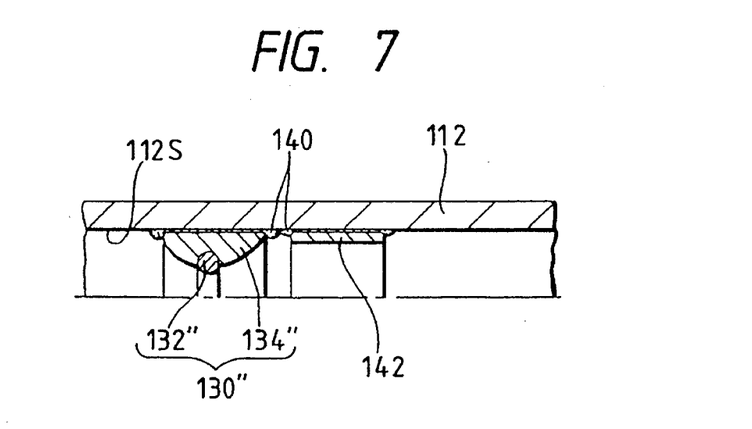
FIG. 7 shows an example of another structure replaceable from the structure shown in FIG. 5.

FIG. 7 shows yet another example of a structure according to the second aspect of the invention. In the structure, an annular fishline guide member 130" including a guide ring 132" and a support element 134" is inserted at a given position in a rod tube 112, and is then fixed at the given position by means of an adhesive agent 140 interposed between the fishline guide member 130" and the inner surface 112S of the rod tube 112. After then, an annular member 142 is fixedly secured to the inner surface 112s of the rod tube 112 at the rear portion of the fishline guide member 130" similarly by means of the adhesive agent 140. In this case, the annular member 142 forms a small diameter portion. Due to provision of the member 142 formed separately from the fishline guide member 130" which is always under the action of a force given by the fishline, even when the adhesive agent 140 is peeled from the fishline guide member 130", the fishline guide member 130" can be prevented against the backward movement thereof.

Figure 8:
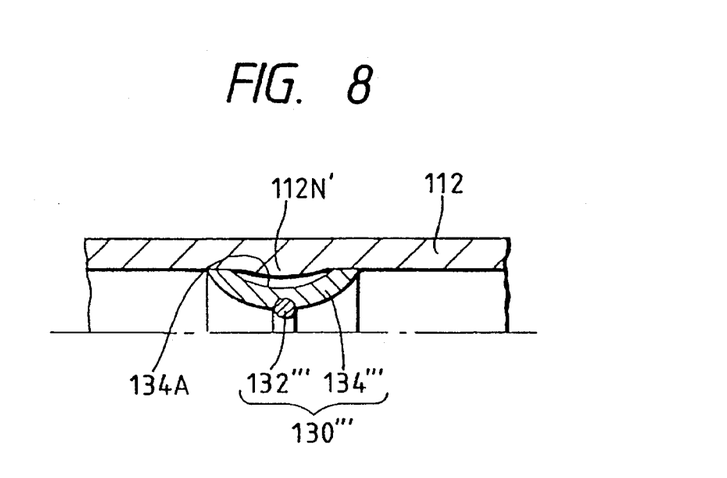
FIG. 8 shows an example of yet another structure replaceable from the structure shown in FIG. 5.

FIG. 8 shows still another example of a structure according to the second aspect of the invention. A rod tube 112 includes at a given position thereof a small diameter portion 112N' which projects inwardly to a slight degree along the whole or part of the inner circumference of the rod tube 112. On the other hand, there is formed a recessed portion 134A on the outer periphery of an annular support element 134''' supporting a guide ring 132''' of a fishline guide member 130'''. By forcing the fishline guide member 130''' into the rod tube while slightly spreading out the diameter of the small diameter portion 112N', the recessed portion 134A is retained on the small diameter portion 112N'. This prevents the fishline guide member 130''' from moving forwardly and backwardly of the rod tube, thereby being able to hold the fishline guide member 130''' at a given position.

Similar effect can be obtained even when the fishline guide member 130''' consists only of a guide ring, unlike the present embodiment. Also, similarly to the embodiment shown in FIG. 5, the small diameter portion may be formed simultaneously when the main body portion of the rod tube 112 is formed, or after the fishline guide member 130''' is fixed at a given position by use of the adhesive agent, the portion of the rod tube corresponding to the fixed fishline guide member 130''' may be deformed or drawn by heating and pressurizing to thereby produce the small diameter portion.

Now, description will be given below of two embodiments according to the third aspect of the invention.

Figure 9:
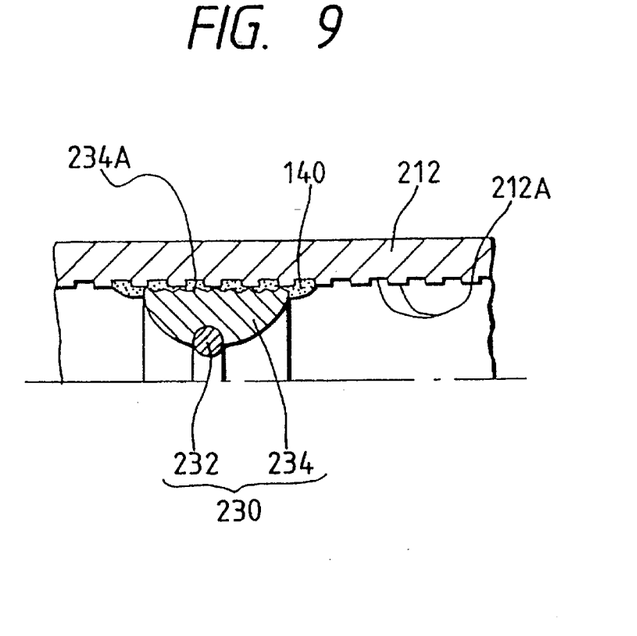
FIG. 9 is an enlarged longitudinal section showing an embodiment according to the third aspect of the invention, corresponding to FIG. 2.

FIG. 9 shows an embodiment according to the third aspect of the invention. In this embodiment, a minute uneven portion 212A is formed integrally on the inner surface of a rod tube 212. On the other hand, the outer peripheral surface 234A of an annular guide member 230 including a guide ring 232 and a support element 234 is also formed in a minute uneven surface portion such as a rough surface or the like. The fishline guide member 230 and the inner surface 212A of the rod tube 212 are fixed to each other by use of an adhesive agent 140 inserted between them. These minute uneven surface portions 212A and 234A increase the adhesive fixing strength between the fishline guide member and the rod tube inner surface to a great extent.

Description will be given here of a method of forming the minute uneven surface portion 212A on the inner surface of the rod tube 212. Before a fiber reinforced prepreg using thermosetting resin or thermoplastic resin is wound around a metal core, a tube having an uneven surface portion is put on the metal core and then the fiber reinforced prepreg is wound around the tube. After then, these are pressurized and heated according to an ordinary process to thereby produce a rod tube and, if the metal core and tube are removed, then there is formed a minute uneven surface portion 212A integrally on the inner surface of the rod tube 212.

Figure 10:
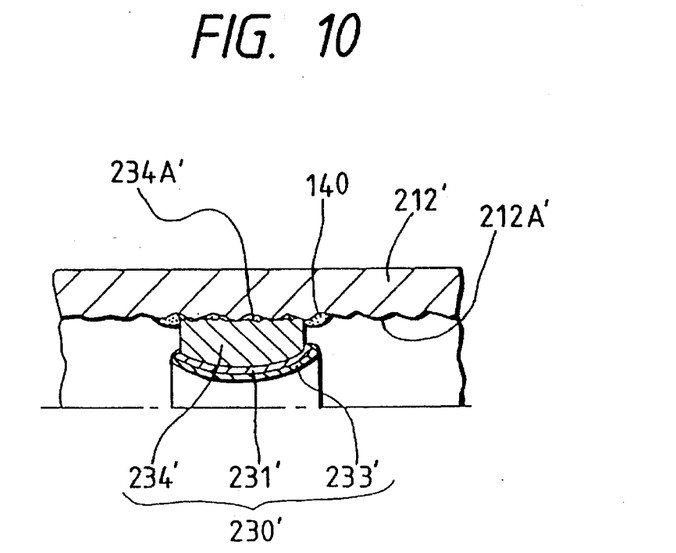
FIG. 10 shows an example of a structure replaceable from the structure shown in FIG. 9.

FIG. 10 shows another embodiment according to the third aspect of the invention, in which a rod tube 212' includes an inner surface 212A' which is formed in a minute uneven surface. To form such minute uneven surface, unlike the former embodiment shown in FIG. 9, such a minute uneven portion is previously formed on the surface of a metal core in such a degree that the minute uneven portion of the metal core enables to permit the removable of the metal core from the rod pipe, and then the rod tube 212' is formed utilizing this metal core according to an ordinary method. On the other hand, an annular fishline guide member 230' includes an annular support element 234', a layer 231' formed of a hard material such as stainless steel or the like and fixed to the inner surface of the annular support element 234', and an ultra-hard film 233' deposited on the inner surface of the layer 231' through the evaporation process.

The fishline guide member 230' includes a minute uneven surface 234A' on the outer peripheral surface thereof. The rod tube 212' and fishline guide member 230' are fixed by an adhesive agent 140 inserted between these minute uneven surfaces 212A' and 234A'. The two minute uneven surfaces 212A' and 234A' improve the adhesive fixture strength between the fishline guide member 230' and rod tube 212' and, even if shocks are given to the fishline guide member 230' due to the influence of the fishline, the adhesive agent is difficult to peel off.

As described above, in the respective embodiments shown in FIGS. 9 and 10, the minute uneven surface is formed on the outer periphery of the fishline guide member as well. However, this is not essential to the present invention. That is to say, what is important for the present invention is to provide the minute uneven surface at least on the inner surface of the rod tube integrally with the main body layer of the rod tube. Since the minute uneven surface is formed integrally with the main body layer of the rod tube, there is no need to machine it after the rod tube is formed and, because only the adhering operation is necessary, it is easy to fix the fishline guide member to the rod tube.

Now, description will be given below of an embodiment according to the fourth aspect of the invention.

Figure 11:
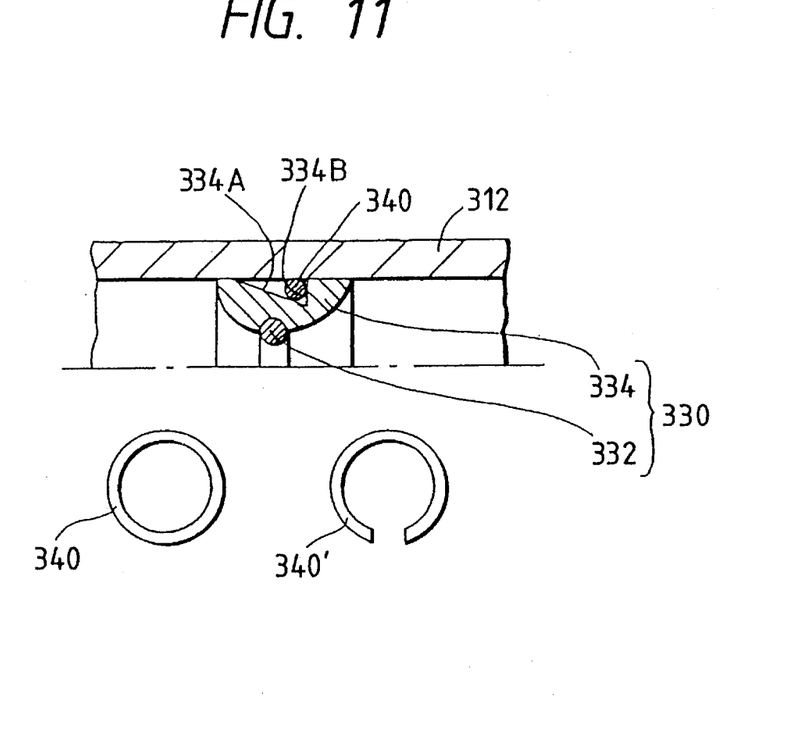
FIG. 11 is an enlarged longitudinal section showing an embodiment according to the fourth aspect of the invention, corresponding to FIG. 2.

FIG. 11 shows the embodiment, in which a rod tube 312 is formed in a forwardly tapered shape, and the outside diameter of an annular support element 334 supporting a guide ring 332 is so set as to be equal to the inside diameter of a given position of the rod tube and the support element 334 is prevented from moving forwardly from the given position.

The support element 334 includes an inclined surface 334A on the outer periphery thereof. The inclined surface 334A cooperates with a vertical wall surface 334B formed at the rear end of the inclined surface 334A to define a recessed portion. The inclined surface 334A is so inclined as to increase the depth of the recessed portion from the leading portion of the support element to be inserted into the rod tube toward the trailing portion thereof. In the recessed portion, there is disposed an annular member 340 which is formed of rubber, resin or the like and has a circular cross section and elasticity. The annular member 340 is formed such that the outside diameter thereof is substantially equal to the inside diameter of the portion of the rod tube 312 for holding a fishline guide member 330.

Since the inclined surface 334A is formed in the above-mentioned manner, when the fishline guide member 330 is inserted into the rod tube, the annular member 340 is frictionally pushed into the deepest position of the recessed portion where the annular member 340 is brought into contact with the vertical wall surface 334B as shown in FIG. 11. Thus, the fishline guide member 330 can be inserted smoothly. On the other hand, when the fishline guide member 330 is going to slip away backwardly, the annular member 340 is going to remain at that position due to its contact friction with rod tube inner surface, and the inclined surface 334A goes onto the inner periphery of the annular member 340. Therefore, the annular member 340 is spread out outwardly in diameter to increase its frictional force with the rod tube inner surface more and more, thereby preventing the fishline guide member 330 from slipping off outwardly. That is to say, the inclined surface 334A, the annular member 340 and the rod tube inner surface provide a wedge action to cooperatively secure the fishline guide member 330 on the given position in case where the fishline guide member 330 is moved backward.

In the above case, alternatively, the fishline guide member 330 may consist only of a guide ring and the support element can be omitted. Also, when the annular member 340 is formed of metal, then, as shown in the lower portion of FIG. 11, it may be formed as a C-shaped annular member 340' and, in this case, the diameter thereof can be spread out by use of a slit portion existing in the C-shaped annular member 340'. Also, an adhesive agent may be used to reinforce the fixation of the fishline guide member to the rod tube inner surface.

Also, instead of the annular member, there can be used a spherical member which has such a size that allows the spherical member to be stored just in the recessed portion. That is, even when two or more of such spherical members are arranged like bearings in the recessed portion, the fishline guide member can be inserted easily but, when the fishline guide member is going to move in the slipping direction, the fishline guide member is prevented against slippage. In this case, it is not necessary that the recessed portion is formed along the whole length of the outer periphery of the fishline guide member 330, but it may be formed partially along the outer periphery of the fishline guide member 330. Also, even if an arc-shaped rod member is used instead of the spherical member, similarly to the above, the fishline guide member can be inserted easily and the slippage thereof can be prevented.

Figure 12:
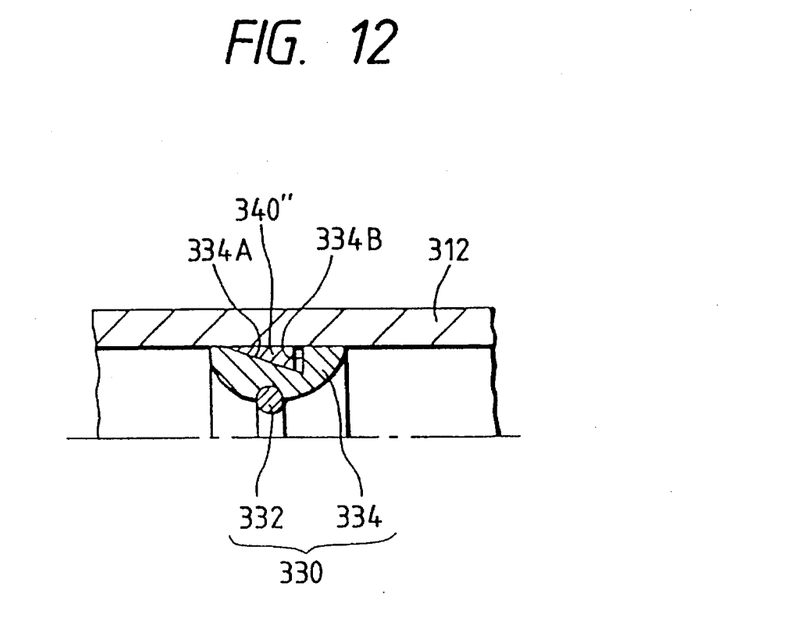
FIG. 12 shows an example of a structure replaceable from the structure shown in FIG. 11.

Although in FIG. 11 description has been given of a case in which the cross sections of the annular member and the like are circular, the present invention is not limited to this but, as shown in FIG. 12, there can be used an annular member 340" which has a wedge-shaped section or a rod-shaped member (that is, a short trigonal prism member).

As can be clearly understood from the foregoing description, according to the first aspect of the invention, since the sharp minute projection is provided, it can get caught on the inner surface of the rod tube to thereby prevent the fishline guide member from moving backwardly.

Also, according to the second aspect of the invention, since the rod tube includes a small diameter portion at the position of the fishline guide member or at a position in the rear of the fishline guide member position, the fishline guide member gets caught there and is thereby prevented from moving backwardly.

Further, according to the third aspect of the invention, since the minute uneven portion is formed integrally on the rod tube inner surface, the fixing power of an adhesive agent interposed between the fishline guide member and the rod tube inner surface is improved to a great extent to thereby be able to hold the fishline guide member positively.

Still further, according to the fourth aspect of the invention, while the fishline guide member can be inserted into the rod tube easily, the inclined surface goes onto the inner periphery of the annular member or the like when the fishline guide member is going to move in the slippage direction thereof to thereby push the annular member outwardly. This increases the contact friction of the annular member with the inner surface of the rod tube to thereby be able to prevent the slippage of the fishline guide member.

Therefore, according to the present invention, there can be provided an inter-line fishing rod in which a fishline guide member can be positively held at a given position even if loads occur during use of the fishing rod or the rod tube is flexed.

What is claimed is:

1. An inter-line fishing rod comprising:

a rod tube designed to permit a fishline to at least partially pass through an inside thereof, said rod tube having an inner surface; and an annular fishline guide member having at least one minute projection formed on an outer periphery thereof facing said inner surface of said rod to provide a longitudinal retaining force in one direction with respect to said rod tube and permitting said guide member to translate in the opposite direction, wherein said minute projection is embedded in said inner surface of said rod tube when said annular fishline guide member is located at a predetermined position with respect to said rod tube so as to retain said annular fishline guide member in said predetermined position.

2. An inter-line fishing rod according to claim 1, wherein said minute projection include a slippage preventive claw directed to bite said inner surface of said rod tube when said annular fishline guide member is displaced from said predetermined position.

3. An inter-line fishing rod according to claim 2, wherein said slippage preventive claw is made of metal material.

4. An inter-line fishing rod according to claim 1, wherein said annular fishline guide member is formed with a recess for receiving a jig used to insert said guide member into said rod tube.

5. An inter-line fishing rod comprising:

a rod tube designed to permit a fishline to at least partially pass through an inside thereof, said rod tube having an inner surface; and an annular fishline guide member having at least one minute projection formed on an outer periphery thereof facing said inner surface of said rod, wherein said minute projection is pressed against said inner surface of said rod tube when said annular fishline guide member is located at a predetermined position with respect to said rod tube so as to retain said annular fishline guide member in said predetermined position; wherein said rod tube includes a fiber-reinforced synthetic layer and a relatively soft film layer made of synthetic resin and formed on said fiber-reinforced resin layer to define said inner surface, wherein said minute projection is in pressure contact with and bites said soft film layer.

6. An inter-line fishing rod according to claim 5, wherein said soft film layer is located at said predetermined position.

7. An inter-line fishing rod comprising:

a one piece rod tube designed to permit a fishline to at least partially pass through an inside thereof, said rod tube having an inner surface; and an annular fishline guide member mounted on said inner surface of said rod tube, wherein:

said rod tube is integrally formed with a small diameter portion on an intermediate portion of said inner surface of said one piece rod tube to retain said annular fishline guide member in a predetermined position.

8. An inter-line fishing rod, comprising:

a rod tube designed to permit a fishline to at least partially pass through an inside thereof, said rod tube having an inner surface; and an annular fishline guide member mounted on said inner surface of said rod tube, wherein:

said rod tube is formed with a small diameter portion on a portion of said inner surface to retain said annular fishline guide member in a predetermined position; and, said small diameter portion is integrally and simultaneously formed when said rod pipe is formed, and located behind said predetermined position; and, said small diameter portion is elastically deformable to permit said annular fishline guide member to pass therethrough to said predetermined position.

9. An inter-line fishing rod comprising:

a rod tube designed to permit a fishline to at least partially pass through an inside thereof, said rod tube having an inner surface; and an annular fishline guide member mounted on said inner surface of said rod tube, wherein:

said rod tube is integrally formed with a small diameter portion on a portion of said inner surface to retain said annular fishline guide member in a predetermined position; and, said rod tube includes a soft film layer defining said inner surface, and wherein said soft film layer is radially outwardly depressed and deformed by said annular fishline guide member to thereby define said small diameter portion in front of and behind said annular fishline guide member located at said predetermined position.

10. An inter-line fishing rod comprising:

a rod tube designed to permit a fishline to at least partially pass through an inside thereof, said rod tube having an inner surface; and an annular fishline guide member mounted on said inner surface of said rod tube, wherein:

said rod tube is formed with a small diameter portion on a portion of said inner surface to retain said annular fishline guide member in a predetermined position; and, an additional annular member is attached to said inner surface to define said small diameter portion behind said annular fishline guide member located at said predetermined position such that said additional annular member prohibits longitudinal backward movement of said fishline guide member even where said fishline guide member is detached from said inner surface of said rod pipe.

11. An inter-line fishing rod comprising:

a rod tube designed to permit a fishline to at least partially pass through an inside thereof, said rod tube having an inner surface; and an annular fishline guide member mounted on said inner surface of said rod tube, wherein:

said rod tube is integrally formed with a small diameter portion on a portion of said inner surface to retain said annular fishline guide member in a predetermined position; and, said small diameter portion is engaged with a recess formed on an outer periphery of said annular fishline guide member.

12. An inter-line fishing rod comprising:

a rod tube designed to permit a fishline to at least partially pass through an inside thereof, said rod tube having an inner surface; and an annular fishline guide member adapted to be mounted on said inner surface of said rod tube, wherein a predetermined uneven surface configuration is formed integrally on said inner surface of said rod tube, and said fishline guide member is adhesively fixed to said predetermined uneven surface configuration, whereby said configuration enhances the adhesion therebetween.

13. An inter-line fishing rod according to claim 12, wherein an outer periphery of said annular fishline guide member is also formed into a minute uneven surface portion.

14. An inter-line fishing rod according to claim 12, wherein, said predetermined uneven surface configuration comprises:

a plurality of longitudinally spaced apart annular recesses formed in said inner surface of said rod tube.

15. An inter-line fishing rod comprising:

a rod tube designed to permit a fishline to at least partially pass through an inside thereof, said rod tube having an inner surface;

an annular fishline guide member mounted on said inner surface of said rod tube, said fishline guide member having a recessed portion formed in an outer periphery of said fishline guide member, said recessed portion defining an inclined surface; and a movement restriction member installed in said recessed portion for performing, in cooperation with said inclined surface and said inner surface, a selective wedge action which permits a movement of said annular fishline guide member along said inner surface in a first direction and inhibits a movement of said annular fishline guide member along said inner surface in a second direction opposite to said first direction.

16. An inter-line fishing rod according to claim 15, wherein said movement restriction member is substantially annular and has a circular cross section.

17. An inter-line fishing rod according to claim 15, wherein said movement restriction member is spherical.

18. An inter-line fishing rod according to claim 15, wherein said movement restriction member has a wedge-shaped section.

19. An inter-line fishing rod comprising:

a rod tube designed to permit a fishline to at least partially pass through an inside thereof, said rod tube having a soft film integrally formed on an inner surface;

an annular fishline guide member adapted to be mounted within said rod tube, said guide member having a helical claw extending from an outer peripheral surface, wherein said helical claw bites into and deforms said soft film to longitudinally retain said guide member within said rod pipe.

* * * * *